United States Patent
Wyman et al.

(10) Patent No.: US 10,417,813 B2
(45) Date of Patent: Sep. 17, 2019

(54) SYSTEM AND METHOD FOR GENERATING TEMPORALLY STABLE HASHED VALUES

(71) Applicant: NVIDIA Corporation, Santa Clara, CA (US)

(72) Inventors: Christopher Ryan Wyman, Redmond, WA (US); Morgan McGuire, Williamstown, MA (US)

(73) Assignee: NVIDIA Corporation, Santa Clara, CA (US)

( * ) Notice: Subject to any disclaimer, the term of this patent is extended or adjusted under 35 U.S.C. 154(b) by 3 days.

(21) Appl. No.: 15/806,144

(22) Filed: Nov. 7, 2017

(65) Prior Publication Data

US 2018/0158233 A1    Jun. 7, 2018

Related U.S. Application Data

(60) Provisional application No. 62/430,281, filed on Dec. 5, 2016.

(51) Int. Cl.
   *G06T 15/50*    (2011.01)
   *G06T 15/40*    (2011.01)
   (Continued)

(52) U.S. Cl.
   CPC .......... *G06T 15/503* (2013.01); *G06T 15/005* (2013.01); *G06T 15/04* (2013.01); *G06T 15/40* (2013.01)

(58) Field of Classification Search
   CPC ....... G06T 15/503; G06T 15/04; G06T 15/40; G06T 15/005
   See application file for complete search history.

(56) References Cited

U.S. PATENT DOCUMENTS

| | | | | |
|---|---|---|---|---|
| 6,014,144 A | * | 1/2000 | Nelson | G06T 15/005 345/426 |
| 6,097,397 A | * | 8/2000 | Lee | G06T 15/04 345/586 |

(Continued)

OTHER PUBLICATIONS

Blinn, James F. "Models of light reflection for computer synthesized pictures", Proceeding SIGGRAPH '77 Proceedings of the 4th annual conference on Computer graphics and interactive techniques, pp. 192-198, San Jose, California—Jul. 20-22, 1977, ACM New York, NY, USA 1977 (Year: 1977).*

(Continued)

*Primary Examiner* — William A Beutel
(74) *Attorney, Agent, or Firm* — Leydig, Voit & Mayer, Ltd.

(57) ABSTRACT

A method for generating temporally stable hash values reduces visual artifacts associated with stochastic sampling of data for graphics applications. A given hash value can be generated from a scaled and discretized object-space for a geometric object within a scene. Through appropriate scaling, the hash value can be discretized and remain constant within a threshold distance from a pixel center. As the geometric object moves within the scene, a hash value associated with a given feature of the geometric object remains constant because the hash value is generated using an object-space coordinate anchored to the feature. In one embodiment, alpha testing threshold values are assigned random, but temporally stable hash output values generated using object-space coordinate positions for primitive fragments undergoing alpha testing. Alpha tested fragments are temporally stable, beneficially improving image quality.

15 Claims, 12 Drawing Sheets

Conventional Alpha Test

Ground Truth

Hashed Alpha Test

(51) Int. Cl.
*G06T 15/00* (2011.01)
*G06T 15/04* (2011.01)

(56) References Cited

U.S. PATENT DOCUMENTS

| | | | |
|---|---|---|---|
| 6,417,861 | B1 | 7/2002 | Deering et al. |
| 6,459,428 | B1 | 10/2002 | Burk et al. |
| 6,747,659 | B2 | 6/2004 | Deering |
| 6,801,202 | B2 | 10/2004 | Nelson et al. |
| 6,825,851 | B1* | 11/2004 | Leather ............ G09G 5/026 345/426 |
| 6,950,109 | B2 | 9/2005 | Deering |
| 6,989,835 | B2 | 1/2006 | Deering et al. |
| 7,471,291 | B2 | 12/2008 | Kaufman et al. |
| 7,965,297 | B2 | 6/2011 | Hoppe |
| 8,698,836 | B2 | 4/2014 | Laine et al. |
| 8,743,142 | B1 | 6/2014 | Hutchins et al. |
| 9,142,056 | B1 | 9/2015 | Baran et al. |
| 9,264,265 | B1 | 2/2016 | Wei |
| 9,299,187 | B2 | 3/2016 | Howson |
| 9,734,624 | B2 | 8/2017 | Haw |
| 9,754,407 | B2 | 9/2017 | Patney et al. |
| 2002/0158856 | A1 | 10/2002 | Deering et al. |
| 2007/0206008 | A1* | 9/2007 | Kaufman ............ G06T 15/06 345/424 |
| 2012/0313961 | A1* | 12/2012 | Laine ............ G06T 15/00 345/592 |

OTHER PUBLICATIONS

Cook, Robert L., et al., "The Reyes image rendering architecture", SIGGRAPH '87 Proceedings of the 14th annual conference on Computer graphics and interactive techniques, pp. 95-102, ACM New York, NY, USA 1987 (Year: 1987).*

Torrance, K.E., et al., "Polarization, Directional Distribution, and Off-Specular Peak Phenomena in Light Reflected from Roughened Surfaces", Journal of the Optical Society of America, vol. 56, No. 7, Jul. 1966 (Year: 1966).*

Benty et al., "The Falcor Rendering Framework," Jul. 2007, pp. 1-3, as retrieved from https://github.com/nvidiagameworks/falcor.

Castano, I., "Computing Alpha Mipmaps," The Witness, Sep. 9, 2010, pp. 1-22, as retrieved from http://the-witness.net/news/2010/09/computing-alpha-mipmaps/.

Enderton et al., "Stochastic transparency," IEEE transactions on visualization and computer graphics, vol. 17, No. 8, 2011, pp. 1036-1047.

Guenter et al., "Foveated 3D graphics," ACM Transactions on Graphics (TOG), vol. 31, No. 6, 2012, pp. 164.1-164.10.

Karis, B., "High-quality temporal supersampling," Advances in Real-Time Rendering in Games, SIGGRAPH Courses 1, 2014, pp. 1-55.

Kharlamov et al., "GPU Gems 3," Addison-Wesley, Chapter 4, Next-Generation SpeedTree Rendering, 2008, pp. 1-25.

Laine et al.,"Stratified sampling for stochastic transparency," Computer Graphics Forum, vol. 30. No. 4., Blackwell Publishing Ltd, 2011, pp. 1-8.

Lottes, T., "FXAA," NVIDIA, 2009, pp. 1-15, as retrieved from https://developer.download.nvidia.com/assets/gamedev/files/sdk/11/FXAA_WhitePaper.pdf.

Moore et al., "Rendering technology at black rock studios," SIGGRAPH Course Notes: Advances in Real-Time Rendering in Games, 2009, pp. 1-107.

Mulder et al., "Pixel masks for screen-door transparency, " In Proceedings of Visualization, 1998, pp. 351-358.

Patney et al., Towards Foveated Rendering for Gaze-Tracked Virtual Reality, ACM Transactions on Graphics, vol. 35, No. 6, Nov. 2016, pp. 179.1-179.12.

Porter et al., "Compositing Digital Images," Computer Graphics, vol. 18, No. 3, Jul. 1984, pp. 1-7.

Saito et al., "Comprehensible rendering of 3-d shape," Computer Graphics (Proc. of SIGGRAPH), vol. 24, No. 4, Aug. 1990, pp. 197-206.

Wyman, C., "Exploring and Expanding the Continuum of OIT Alogrithms," In High Performance Graphics, 2016, pp. 1-11.

Wyman, C., "Stochastic Layered Alpha Blending," ACM SIGGRAPH 2016 Talks, 2016, pp. 1-2.

Lefebvre et al., "Perfect Spatial Hashing," Microsoft Research, 2006, 10 pages, retrieved from http://hhoppe.com/perfecthash.pdf.

* cited by examiner

```
// Find discretized derivatives of 3D poistion
float maxDeriv = max( length(dFdx(objCoord.xyz)),
                     length(dFdy(objCoord.xyz)) );
```
⎫
⎬ 141
⎭

```
// Calculate localized scale
float pixScale = 1.0/(g_HashScale*maxDeriv);

// Find two nearest log-discretized noise scales
vec2 pixScales = vec2( exp2(floor(log2(pixScale))),
                       exp2(ceil(log2(pixScale))) );
```
⎫
⎬ 142
⎭

```
// Compute alpha thresholds at two noise scales
vec2 alpha = vec2(hash3D(floor(pixScales.x*objCoord.xyz)),
                  hash3D(floor(pixScales.y*objCoord.xyz)));
```
⎫
⎬ 143
⎭

```
// Factor to linearly interpolate (lerp)
float lerpFactor = fract( log2(pixScale) );
```
⎫
⎬ 144
⎭

```
// Interpolate alpha threshold from noise at two scales
float x = (1-lerpFactor)*alpha.x + lerpfactor*alpha.y;
```
⎫
⎬ 145
⎭

```
// Pass into CDF to compute uniformly distributed threshold
float a = min( lerpFactor, 1-lerpFactor );
vec3 cases = vec3( x*x/(2*a*(1-a)),
                   (x-0.5*a)/(1-a),
                   1.0-((1-x)*(1-x)/2*a*(1-a))) );
```
⎫
⎬ 146
⎭

```
// Find final, uniformly distributed threshold
float ατ = (x < (1-a)) ?
           ((x<a) ? cases.x : cases.y) : cases.z;
```
⎫
⎬ 147
⎭

```
// Clamp to avoid ατ == 0.
ατ = clamp( ατ, 1.0e-6, 1.0);
```
⎫
⎬ 148
⎭

*Fig. 1D*

```
// Find the discretized derivatives of our coordinates
vec3 anisoDeriv = max( abs(dFdx(objCoord.xyz)),
                      abs(dFdy(objCoord.xyz)) );

vec3 anisoScales = vec3(0.707/(g_HashScale*ansioDeriv.x),
                        0.707/(g_HashScale*anisoDeriv.y),
                        0.707/(g_HashScale*anisoDeriv.z) );
```
⎫
⎬ 151
⎭

```
// Find log-discretized noise scales
vec3 scaleFlr  = vec3( exp2(floor(log2(anisoScales.x))),
                       exp2(floor(log2(anisoScales.y))),
                       exp2(floor(log2(anisoScales.z))) );
vec3 scaleCeil = vec3( exp2(ceil(log2(anisoScales.x))),
                       exp2(ceil(log2(anisoScales.y))),
                       exp2(ceil(log2(anisoScales.z))) );
```
⎫
⎬ 152
⎭

```
// Compute alpha thresholds at our two noise scales
vec2 alpha = vec2(hash3D(floor(scaleFlr*objCoord.xyz)),
                  hash3D(floor(scaleCeil*objCoord.xyz)));
```
⎫
⎬ 153
⎭

```
// Factor to linearly interpolate with
vec3 fractLoc = vec3( fract(log2( anisoScale.x )),
                      fract(log2( anisoScale.y )),
                      fract(log2( anisoScale.z )) );
vec2 toCorners = vec2( length(fractLoc),
                       length(vec3(1.0f)-fractLoc) );
float lerpFactor = toCorners.x/(toCorners.x+toCorners.y);
```
⎫
⎬ 154
⎭

```
// Interpolate alpha threshold from noise at two scales
float x = (1-lerpFactor)*alpha.x + lerpFactor*alpha.y;
```
⎫
⎬ 155
⎭

```
// Pass into CDF to compute uniformly distrib threshold
float a = min( lerpFactor, 1-lerpFactor );
vec3 cases = vec3( x*x/(2*a*(1-a)),
                   (x-0.5*a)/(1-a),
                   1.0-((1-x)*(1-x)/(2*a*(1-a))) );
```
⎫
⎬ 156
⎭

```
// Find final, uniformly distributed alpha threshold
float ατ = (x < (1-a)) ?
                ((x < a) ? cases.x : cases.y) : cases.z;
```
⎫
⎬ 157
⎭

```
// Clamp to avoid ατ == 0
ατ = clamp( ατ , 1.0e-6, 1.0 );
```
⎫
⎬ 158
⎭

*Fig. 1E*

Conventional
Alpha Test

Isotropic
Hashed Alpha Test

Anisotropic
Hashed Alpha Test

8x Isotropic
Hashed Alpha Test

8x Anisotropic
Hashed Alpha Test

SYSTEM AND METHOD FOR GENERATING TEMPORALLY STABLE HASHED VALUES

CLAIM OF PRIORITY

This application claims the benefit of U.S. Provisional Application No. 62/430,281 titled "Hashed Alpha Testing," filed Dec. 5, 2016, the entire contents of which is incorporated herein by reference.

FIELD OF THE INVENTION

The present invention relates to image rendering, and more particularly to systems and methods for generating temporally stable hashed values.

BACKGROUND

One common aspect of image rendering involves sampling a texture map to generate output pixels in a rendered scene. Certain texture map sampling techniques can be highly advantageous for rendering performance, but may produce undesirable visual artifacts. For example, rendering a simple base geometry (e.g., two triangles forming a rectangle) using alpha-tested geometry with an associated texture map of a tree can produce apparent geometric complexity of leaves and branches that would otherwise require many thousands of polygons and incur a performance penalty. Using alpha-tested geometry, branches and leaves are typically assigned an opaque alpha value and open spaces are typically assigned a fully transparent alpha value. Performance can be improved using alpha-tested geometry because significant scene detail (e.g., branches and leaves) need not be processed and rendered as separate geometric objects, and transparent fragments can be discarded without additional processing. While conventional alpha-tested geometry techniques offer significant performance advantages, undesirable visual artifacts such as flickering and disappearing geometry can occur. Thus, there is a need for addressing these issues and/or other issues associated with the prior art.

SUMMARY

A method, computer readable medium, and system are disclosed for generating temporally stable hash values for generating graphics data. The method comprises identifying a three-dimensional (3D) position for a primitive fragment in a 3D coordinate space, calculating an appropriate, localized scale for discretization of the 3D position, calculating a discretized position based on the 3D position and the localized scale, providing the discretized position as an input to a hash function to produce a random value, sampling an attribute associated with the primitive fragment to produce an attribute sample within an associated pixel location for the primitive fragment, calculating a result based on mathematical operations involving the attribute sample and the random value, generating the graphics data based on the result. The discretized position is constant within a threshold distance of the 3D position according to the localized scale. In one embodiment, a graphics processing unit (GPU) is configured to sample the attribute associated with the primitive fragment. Furthermore, the GPU is configured to generate the graphics data.

The computer readable medium includes instructions that, when executed by a processing unit, perform the method. Furthermore, the system includes circuitry configured to perform the method.

BRIEF DESCRIPTION OF THE DRAWINGS

FIG. 1D illustrates programming instructions for calculating an alpha threshold for isotropic hashed alpha testing, in accordance with one embodiment;

FIG. 1E illustrates programming instructions for calculating an alpha threshold for anisotropic hashed alpha testing, in accordance with one embodiment;

DETAILED DESCRIPTION

Figure 1A:
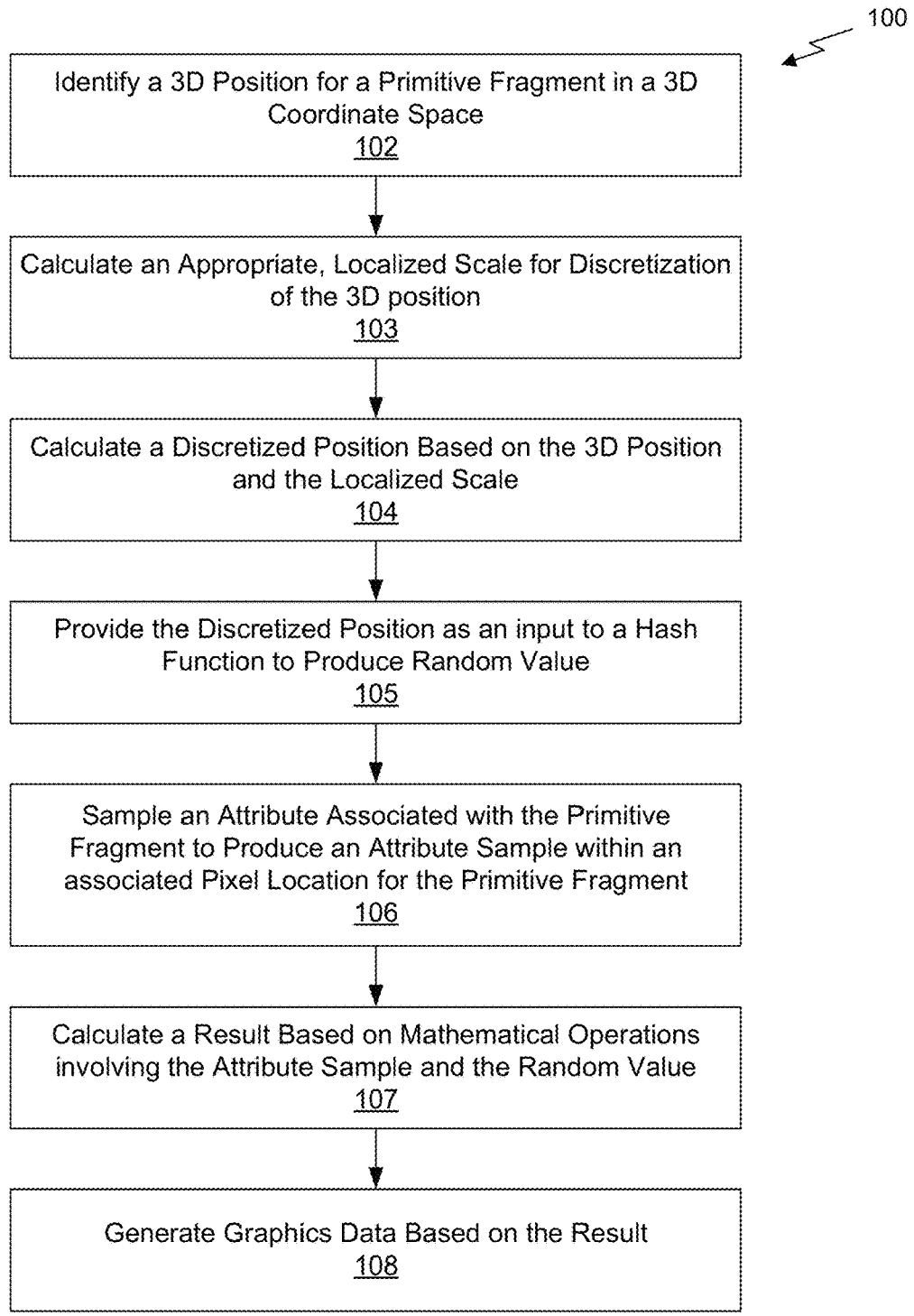
FIG. 1A illustrates a flowchart of a method for hash sampling using discretized inputs, in accordance with one embodiment.

Embodiments of the present invention improve rendering quality for alpha tested image sequences. In particular, various embodiments solve the long-standing problem of disappearing and/or flickering geometry artifacts associated with alpha-tested geometry in rendered scenes. Such artifacts commonly occur when rendering objects that use alpha-tested and filtered mipmaps, with alpha-tested geometry disappearing as distance to an observing camera increases over several frames. The artifacts are due, in part, to a reduction in alpha variance from filtering that converges to the mean, which is often less than a fixed 0.5 alpha test threshold for transparency. In certain settings, such as real-time games, developers pre-compute per-level-of-detail alpha thresholds (which can enlarge small details) for certain geometric objects in a scene. By adjusting the alpha-test threshold for fragment transparency of a given object, visual artifacts associated with the object can be generally reduced. However, this approach generally requires manual threshold assignment.

Applying a randomly-selected alpha threshold for every pixel generally eliminates artifacts associated with disappearing geometry, but introduces temporal noise. Hashed alpha testing provides the same benefit but uses a temporally stable (hashed) noise function that remains consistent between rendered frames, even under motion. In such settings, the hash function should provide the following three properties: (1) determinism, (2) a defined output range, and (3) uniformity over the output range. The determinism property specifies that the hash function will produce the same output for identical input value(s). The defined range bounds the value of hash function outputs. For example, a given hash function may have a range of [0 . . . 1), which is inclusive of zero and exclusive of one. Other ranges may be implemented according to a particular implementation. Hash function uniformity generally means hash function output values are evenly and randomly (but deterministically) distributed over the output range. Certain embodiments described herein implement a hash function that provides these three properties. Alternative embodiments may implement a hash function that substantially meets the three properties.

In certain embodiments, hash input values are discretized and anchored in three-dimensional (3D) space to scene geometry undergoing alpha testing. A given discretized hash input value comprises a discretized position that remains constant within a threshold distance of a 3D position according to the localized scale. For example, a localized scale may be calculated based on a pixel-sized region in screen space projected onto the scene geometry. Movement of the scene geometry and/or camera position within the threshold distance provides a constant discretized position as an input to the hash function. Furthermore, as an instance of scene geometry moves laterally a distance of multiple pixels, the discretized position may remain constant (anchored to the scene geometry), providing stable hash values at different 3D locations on the scene geometry for performing alpha testing. By providing stable hash values, a rendering system may avoid disappearing, flickering, or swimming appearance as objects move or camera positions change over time.

To anchor the hash input values to a geometric object, an appropriate 3D coordinate frame (e.g., texture space coordinates including a level of detail value, world space coordinates, or object-space coordinates) may be selected. For example, 3D object-space coordinates remain anchored and invariant with respect to a region on an object regardless of object or camera motion. When used as hash input values, coordinates from a 3D object-space produce hash output values (e.g., alpha threshold values) that remain consistent for each image in a sequence (i.e., frame) and anchored to a region on the object. Applying alpha testing to these values produces stable, motion invariant results. In one embodiment, 3D object-space coordinates are used as hash input values. In another embodiment, coordinates in a texture coordinate space are used for the hash input values. In yet another embodiment, coordinates in a global coordinate space are used for the hash input values.

The hash function provides a stable random noise function that is tied to object geometry with object-space coordinates serving as hash input values. The object-space coordinates can be scaled according to screen-space derivatives (with respect to object-space coordinates) to provide various levels-of-detail and clamped for use as hash inputs, causing all values within a pixel-scale region to generate the same hashed value.

Two related embodiments are disclosed herein. In a first embodiment, isotropic hashed alpha values are used. In a second embodiment, anisotropic hashed alpha are used. Additionally, a transition from conventional alpha threshold testing to hashed alpha threshold testing may be performed as a distance from the camera to the 3D position increases. Any hash function that substantially satisfies the three properties (determinism, a defined output range, and uniformity over the output range) for a hash function stated herein may be implemented to generate hashed alpha threshold values.

While the present disclosure primarily describes hashed alpha testing, techniques disclosed herein for discretized hashing can be applied more generally to any technically appropriate stochastic sampling application. A hashed value can be, without limitation, an alpha threshold, a transparency, a direction, or highlight color, such as a specular highlight color (glint). In various embodiments, the method or methods disclosed herein can be executed by a GPU, CPU, or any processor capable of generating hashed values based on a position in a 3D space.

FIG. 1A illustrates a flowchart of a method 100 for hash sampling using discretized inputs, in accordance with one embodiment. Although the method 100 is described in conjunction with the systems of FIGS. 2-5, any processing system that implements method 100 is within the scope and spirit of embodiments of the present disclosure. In various embodiments, method 100 is implemented in the context of a graphics system, configured to render graphics data from scene information comprising graphics primitives. One or more operations of the method 100 may be performed by task-specific circuitry or by a combination of task-specific circuitry and general-purpose processing units. In one embodiment, method 100 is implemented by a processing system, which may include a general purpose central processing unit (CPU), a parallel (PPU), such as PPU 200 of FIG. 2, or any combination thereof.

At step 102, the processing system identifies a three-dimensional (3D) position for a primitive fragment in a 3D coordinate space. In one embodiment, the 3D position may be identified by mapping a screen space position to an object-space 3D position. The object-space 3D position is located on geometry representing an object, where the object-space 3D position is associated with a primitive fragment. In alternative embodiments, the 3D position may be identified by mapping the screen space position to a 3D world space position or mapping to a texture space position.

At step 103, the processing system calculates an appropriate, localized scale for discretization of the 3D position. In one embodiment, the localized scale is calculated using gradients associated with the primitive fragment at the 3D position. In one embodiment, the gradients are calculated as partial derivatives of a function F (e.g., depth) with respect to a screen space vertical axis (y-axis) and a screen space horizontal axis (x-axis). In this context, a partial derivative of the function F with respect to the screen space x-axis is represented as dFdx and is calculated using local differencing of the function F along the screen space x-axis. Similarly, a partial derivative of the function F with respect to the screen space y-axis is represented as dFdy and is calculated using local differencing of the function F along the screen space y-axis. The local differencing may be calculated with respect to immediate neighboring samples of the function F. The localized scale may cause a discretized position to be constant within a threshold distance of the 3D position. The localized scale defines the threshold distance. For example, the center of a screen space pixel may be mapped to the primitive fragment at the 3D position, and the threshold distance can be defined as the object-space distance to the pixel edge at the 3D position. In one embodiment, an appropriate scale maps a screen space region of at least one pixel to the threshold distance around the 3D position.

At step 104, the processing system calculates a discretized position based on the 3D position and the localized scale. In one embodiment, the discretized position is a 3D position, with each dimension scaled according to an associated scale value for the dimension and discretized by truncating fractional results after being scaled. This causes the discretized position to be constant within the threshold distance associated with the localized scale. If, for example, the localized scale is calculated to correspond to a screen space pixel size, then any change to 3D position within the threshold distance will produce a constant discretized position.

At step 105, the processing system provides the discretized position as an input to a hash function to produce a random value. The hash function may receive a vector corresponding to coordinates of the discretized position and return a scalar corresponding to the random value.

At step 106, the processing system samples an attribute associated with the primitive fragment to produce an attribute sample within an associated pixel location for the primitive fragment. In one embodiment, the attribute sample is a transparency (e.g., alpha) value for the primitive fragment, provided by sampling an associated texture map.

At step 107, the processing system calculates a result based on mathematical operations involving the attribute sample and the random value. In one embodiment, the attribute sample is a sampled alpha value and the random value is used as an alpha test threshold for performing alpha testing, such as geometric alpha testing. If the alpha test indicates the primitive fragment is opaque, then the primitive fragment is processed further. If the alpha test indicates the primitive fragment is transparent, then the primitive fragment may be discarded.

Using the random value as an alpha test threshold can mitigate the impact of reductions in alpha variance from filtering, which can lead to disappearing geometry. Furthermore, the use of a discretized hash input value that is anchored to a 3D position for the primitive fragment can reduce or eliminate flickering and/or crawling artifacts otherwise associated with relative motion between a camera view and an object associated with the primitive fragment.

At step 108, the processing system calculates graphics data based on the result. In one embodiment, the graphics data includes a primitive fragment that has passed alpha testing. In another embodiment, the graphics data comprises a pixel value for the fragment being written to an output image.

In another embodiment, the attribute sample is a material property, the random value is a selected direction, and the graphics data (result of method 100) is lighting sampled according to the selected direction. In yet another embodiment, the attribute sampled is an opacity value, the random value is a stochastic transparency threshold, and the graphics data (result) is a transparency value assigned to the primitive fragment and/or a result pixel generated from the primitive fragment. In still yet another embodiment, the attribute sampled is a surface roughness, the random value represents a set of discrete surface facets, and the graphics data (result) is a specular highlight color value (glint).

More detail will not be set forth regarding different embodiments associated with method 100. In particular, isotropic and anisotropic techniques are disclosed, along with techniques for reducing artifacts associated with alpha testing in these contexts. Additional applications beyond alpha testing are also disclosed.

Figure 1B:
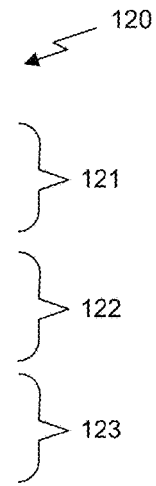
FIG. 1B illustrates programming instructions for calculating an alpha threshold for hashed alpha testing, in accordance with one embodiment.

FIG. 1B illustrates programming instructions 120 for calculating an alpha threshold (at) for hashed alpha testing, in accordance with one embodiment. As shown, programming instructions 120 include code blocks 121 through 123. In one embodiment, code blocks 121 through 123 may be used to implement steps 103 to 105 of method 100.

In step 102 of method 100, a 3D position is identified for the primitive fragment in a 3D coordinate space. The 3D position corresponds to a vec3 variable named objectCoord.xyz in the programming instructions 120. In one embodiment, the 3D position is an object-space coordinate assigned to the primitive fragment when the primitive fragment is generated (e.g., during rasterization of a geometric primitive). In another embodiment, the 3D position is identified using a standard graphics language function unProject( ) or gluUnProject( ) to map a screen space location (e.g. a pixel center location) to the 3D position (objectCoord.xyz) in the 3D coordinate space (object space). In alternative embodiments, the 3D position is assigned a global-space or texture-space 3D coordinate for the primitive fragment.

For stable pixel-scale noise, object-space coordinates are normalized (appropriately scaled with respect to localized scale) and subsequently discretized according to screen-space derivatives. To this end, code block 121 calculates two gradients using the standard graphics language functions dFdx( ) and dFdy( ) with a pixel scale derivative (pixDeriv) calculated from the two gradients and used for scaling. A call to the standard graphics language function length( ) provides a scalar length value for each of the two gradients, and the function max( ) is used to pick a maximum (larger) gradient scalar value of the two gradient lengths. In code block 122, the maximum gradient scalar defines a pixel scale derivative (pixDeriv) that is used to calculate a scale factor (pixScale) for normalizing and discretizing objectCoord.xyz. A scaling parameter g_HashScale controls the target noise scale, measured in pixel size. When g_HashScale is equal to 1.0, the resulting noise scale is one pixel, meaning hash values are constant within a half-pixel threshold distance from a pixel center. Larger values for g_HashScale can be used to produce a thicker, more pixilated appearance. In one embodiment, code block 122 is used to implement step 103 of method 100.

In code block 123, a scaled 3D position is calculated by multiplying component values of the 3D position (objectCoord.xyz) by a scale factor (pixScale). A call to standard graphics language function floor( ) is used to calculate a discretized position of the scaled 3D position. In one embodiment, these operations are used to implement step 104 of method 100. The discretized position is then used as input parameters to call a three-dimensional hash function, hash3D( ), which produces a random value. In this context, the random value is assigned to be an alpha test threshold value (at). In one embodiment, step 105 of method 100 is implemented as a call to hash3D( ) using the discretized position (a vec3 value) as input.

In one embodiment, programming instructions 120 are used to implement steps 103-105 of method 100. Other embodiments are described in FIGS. 1D and 1E.

Figure 1C:
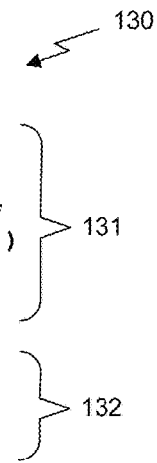
FIG. 1C illustrates programming instructions for calculating an exemplary three-dimensional hash function, in accordance with one embodiment.

FIG. 1C illustrates programming instructions 130 for calculating an exemplary three-dimensional hash function (hash3D), in accordance with one embodiment. As shown, a code block 131 implements a hash( ) function operable on two input variables to produce an output (return) hash value. Furthermore, code block 132 illustrates an exemplary hash3D( ) function being constructed using two calls to the hash( ) function of code block 131. In this example, the a output of a first call to hash( )) serves as one input to a second call to hash( ). While the technique illustrated in programming instructions 130 meets the three properties for a hash function in the present context, any other technique may be implemented instead.

FIG. 1D illustrates programming instructions 140 for calculating an alpha threshold (at) for isotropic hashed alpha testing, in accordance with one embodiment. As shown, programming instructions 140 include code blocks 141 through 148. In one embodiment, code blocks 141 through 148 may be used to implement steps 103 to 105 of method 100.

Programming instructions 140 build on programming instructions 120 to reduce artifacts associated with object translations and/or motion in depth (z). In particular, programming instructions 140 calculate an alpha threshold by interpolating between two discrete hash values associated with two nearest noise scale factors. In one embodiment, the two nearest noise scale factors are calculated at a pixel center. As a given fragment is translated in depth, an associated hash value is interpolated from a first (lower, from floor function) discrete hash value and a second (higher, from ceiling function) discrete hash value, with the first discrete hash value calculated at a first discrete scale factor and the second discrete hash value calculated at a second discrete scale factor.

Programming instructions 140 calculate the alpha threshold based on the 3D position and the scaling parameter g_HashScale. In one embodiment, the 3D position, indicated as objectCoord.xyz in code block 141, may be identified using a standard graphics language function such as unProject( ) or gluUnProject( ). In alternative embodiments, the 3D position is assigned a global-space or texture-space 3D coordinate for the primitive fragment.

As shown, code block 141 calculates a pixel scale derivative (pixDeriv) from two gradients provided by calls to dFdx( ) and dFdy( ). Code block 142 uses the pixel scale derivative to calculate a first discrete scale factor using a floor( ) function, and a second discrete scale factor using a ceiling function ceil( ). The first and second discrete scale factors are stored in a vec2 variable pixScales, as pixScales.x and pixScales.y, respectively.

Code block 143 calculates a first hash value according to the first discrete scale and a second hash value according to the second discrete scale. In this context, the first hash value is used as a first alpha threshold and the second hash value is used as a second alpha threshold. The first and second alpha thresholds are stored in a vec2 variable named alpha (as alpha.x, alpha.y). Code block 144 calculates an interpolation factor (lerpFactor) using a fractional component of a base two logarithm of scale factor pixScale (not discretized). The fractional component can be calculated by a call to the standard graphics language function fract( ). The interpolation factor is used to interpolate between the first alpha threshold and the second alpha threshold. This is illustrated in code block 145, which calculates an intermediate alpha threshold value by interpolating between the first alpha threshold (alpha.x) and the second alpha threshold (alpha.y), based on the interpolation factor lerpFactor.

Interpolating between two uniformly distributed values (e.g., the hash values described herein) does not necessarily yield a new uniformly distributed value. In the context of calculating an alpha threshold for hashed alpha testing, such a lack of uniformity can introduce a "strobing" artifact as an object undergoes translation in depth (z) because the variance of hashed noise can change during motion. However, this issue can be solved by transforming the interpolated output (intermediate alpha threshold) back into a uniform distribution using a cumulative distribution function (CDF) of the two interpolated uniform random values. Equation 1 describes a suitable cumulative distribution function for this purpose:

$$cdf(x) = \begin{cases} \dfrac{x^2}{2a(1-a)}; & 0 \leq x < a \\ \dfrac{x - a/2}{1-a}; & a \leq x < 1-a \\ 1 - \dfrac{(1-x)^2}{2a(1-a)}; & 1-a \leq x < 1 \end{cases} \quad (1)$$

Code blocks 146 and 147 calculate a CDF-adjusted alpha threshold. More specifically, code block 146 calculates three possible case values of the CDF function defined in Equation 1 for the three specified cases, and code block 147 selects one of the three possible cases according to which one of the three specified cases is true. Code block 148 clamps the alpha threshold to avoid an output alpha threshold of zero. Additional clamp conditions may also be implemented (not shown).

Alpha testing using alpha thresholds calculated according to isotropic techniques of programming instructions 140 provides a uniform noise scale irrespective of surface orientation. However, this approach creates anisotropy if a surface is viewed obliquely, as projected noise scales differ along screen-space x and y dimensions. Anisotropy arises when voxels of constant hash value project into screen space with different extents in the x and y dimensions. Uniform discretization as described herein generates pixel-scale noise only along one axis. Noise along the other axis will either be sub-pixel in scale or too large, thereby reintroducing temporal flicker or generating elongated regions having constant hash values. Techniques for mitigating anisotropy are disclosed in FIG. 1E, where three discretization scales (one for each of three object-space axes) are used rather than one scale as described in FIGS. 1B and 1D.

FIG. 1E illustrates programming instructions 150 for calculating an alpha threshold (at) for anisotropic hashed alpha testing, in accordance with one embodiment. As shown, programming instructions 150 include code blocks 151 through 158. In one embodiment, code blocks 151 through 158 may be used to implement steps 103 to 105 of method 100.

Programming instructions 150 build on programming instructions 140 to reduce artifacts associated with anisotropy. In particular, programming instructions 150 calculate different scales for discretization along each of three axes for the 3D position (e.g., object-space axes). Anisotropy is reduced by scaling and discretization according to the independent scale factors for each axis. As shown, code block 151 calculates a maximum gradient vector (anisoDeriv) at the 3D position (objCoord.xyz) by selecting maximum gradient components from each of two gradient inputs at the 3D position. A scale vector (anisoScales) is calculated to include anisotropic scale factors. Code block 152 calculates a floor scale vector (scaleFlr) and a ceiling scale vector (scaleCeil) based on the scale vector (anisoScales). In one embodiment, these operations are used to implement step 103 of method 100.

Code block 153 calculates a first scaled 3D position by multiplying each component of the 3D position (objectCoord.xyz) with a corresponding component of the floor scale vector. Furthermore, code block 153 calculates a second scaled 3D position by multiplying each component of the 3D position with a corresponding component of the ceiling scale vector. In one embodiment, these operations are used to implement step 104 of method 100.

The first scaled 3D position comprises a first discretized position used for a first hash function call and the second scaled 3D position comprises a second discretized position used for a second hash function call. In this context, the output of the first hash function call and the output of the second hash function call comprise a first alpha threshold (alpha.x) and a second alpha threshold (alpha.y), respectively.

Code block 154 calculates an interpolation factor (lerpFactor) using a fractional component of a base two logarithm of the scale vector (anisoScales) components (pre-discretization). The interpolation factor is used to interpolate between the first alpha threshold and the second alpha threshold. This is illustrated in code block 155, which calculates an intermediate alpha threshold value by interpolating between the first alpha threshold (alpha.x) and the second alpha threshold (alpha.y), based on the interpolation factor lerpFactor. Code blocks 156 and 157 together restore uniform distribution using a CDF function, such as the CDF function of Equation 1. Code block 158 clamps the alpha threshold to avoid an output alpha threshold of zero. Additional clamp conditions may also be implemented (not shown). In one embodiment step 105 of method 100 includes the hash function calls of code block 153, and certain operations of code blocks 154 through 158.

In one embodiment, logic circuits are configured to directly implement one or more code blocks of the programming instructions 120, 130, 140, and 150. The logic circuits may include arithmetic circuits and/or control circuit for performing one or more operations specified in the one or more code blocks. In certain embodiments, the logic circuits may be implemented as function units within parallel processing unit 200 of FIG. 2. The logic circuits may perform specified operations in connection with operation of a graphics processing pipeline, such as graphics processing pipeline 600 described in FIG. 6. For example, hashed alpha testing may be implemented in the context of graphics processing pipeline 600, with the logic circuits configured to generate hash values used for alpha testing thresholds within fragment shading stage 670 or raster operations stage 680 of graphics processing pipeline 600. In one embodiment, the one or more code blocks are implemented as logic circuits within a fixed-function fragment shader, a programmable fragment shader, a fixed-function raster operations unit, a programmable raster operations unit, or a combination thereof.

Figure 1F:
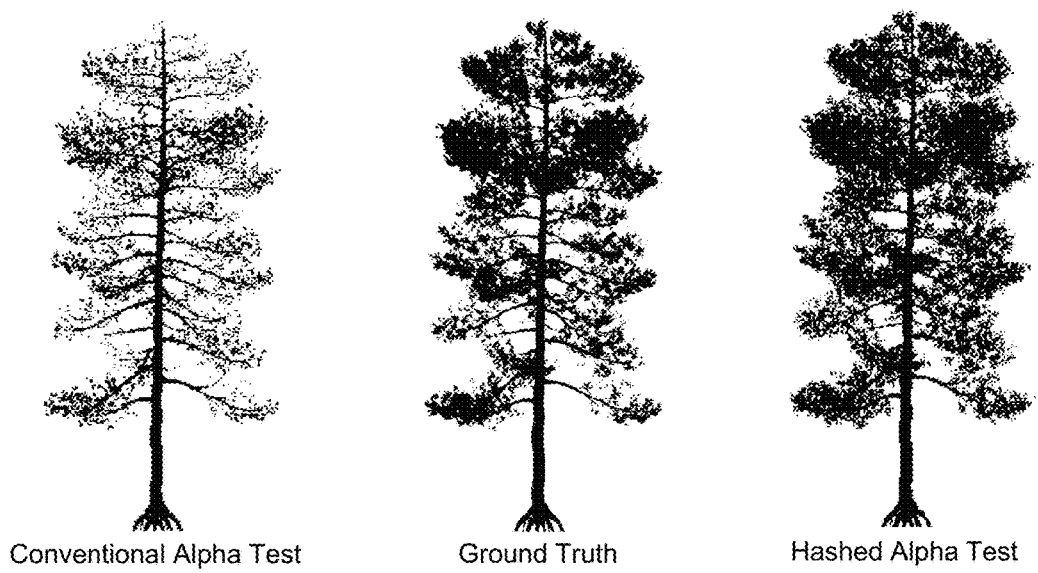
FIG. 1F illustrates visual differences between an exemplary ground truth image and related images rendered using various forms of alpha testing, in accordance with one embodiment.

FIG. 1F illustrates visual differences between an exemplary ground truth image and related images rendered using conventional alpha testing and hashed alpha testing, in accordance with one embodiment. As shown, conventional alpha-testing can cause certain regions that should be covered to disappear relative to the ground truth image. Conventional alpha-testing can cause certain tree geometry to disappear, creating a much sparser overall appearance than the ground truth image of the tree. Hashed alpha testing improves coverage, creating a more accurate overall appearance than the conventional alpha-testing image of the tree. Hashed alpha testing techniques advantageously reduce artifacts associated with relative motion between a scene object, such as the tree, and a camera position.

In various embodiments, multiple attribute samples may be taken for a given primitive fragment or pixel. For example, multiple alpha testing samples may be taken for a fragment and combined to produce a final value. The multiple attribute samples may be taken at different locations or accumulated over multiple frames. Furthermore, multiple corresponding thresholds may be generated for the multiple samples. In one embodiment multi-sample anti-aliasing (MSAA) is implemented to generate pixel outputs from two or more samples each.

Figure 1G:
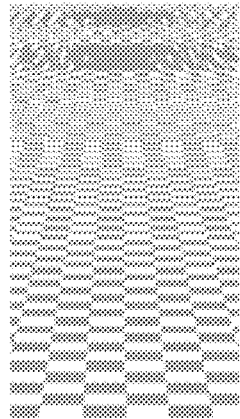
FIG. 1G illustrates rendering artifacts associated with different forms of alpha testing, in accordance with one embodiment.
Figure 1G:
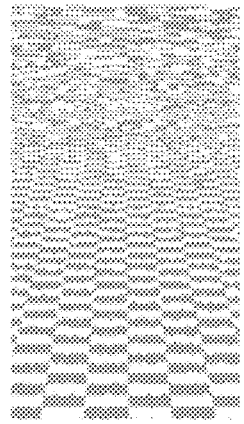
Figure 1G:
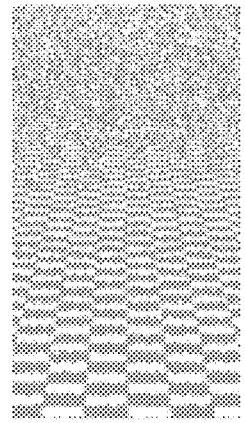
Figure 1G:
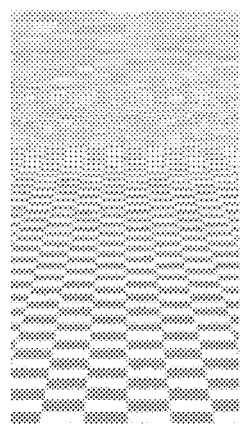
Figure 1G:
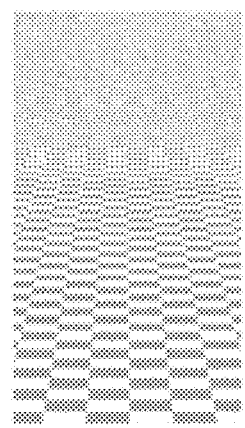

FIG. 1G illustrates rendering artifacts associated with different forms of alpha testing, in accordance with one embodiment. The rendering artifacts illustrate anisotropy as well as improvements obtained by using multiple samples per primitive fragment or per pixel. A planar checker-board texture is shown containing half opaque and half transparent texels. In this example, alpha testing does not cause geometry to necessarily disappear with distance but does cause aliasing. Hashed alpha testing replaces aliasing with noise, and using MSAA-based alpha-to-coverage converges to a desired uniform gray in the distance.

Beyond use for distant for low-resolution alpha-mapped geometry, other embodiments implement hashed alpha testing for head-mounted displays for virtual reality, where rendering at full resolution in a user's periphery is wasteful. In foveated rendering, a lower resolution is rendered in the periphery of a user's vision. In one embodiment a foveated rendering system implements hashed alpha testing to provide pre-filtering.

In certain embodiments, light transport algorithms implement Monte-Carlo sampling to approximate a rendering equation. Real-time constraints can prevent the use of an increased ray count needed to avoid temporal noise. A common approach defines per-pixel, fixed pseudo-random seeds, but this can cause screen-door effects that are visible as geometry moves relative to the screen. Using variations of the techniques disclosed herein, samples can be generated using a stable, pixel-sized grid. This produces largely stable noise that stays fixed to geometry, even when the geometry moves. A stable hash may be used to generate a stable ambient occlusion image using one or more samples per pixel. In one embodiment, a hash result is used to seed a unique pseudo-random number generator per pixel. In another embodiment, multiple samples may be used (e.g., similar to the MSAA-sampling discussed herein) to each generate a random ray direction for sampling incoming lighting at a given primitive fragment.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
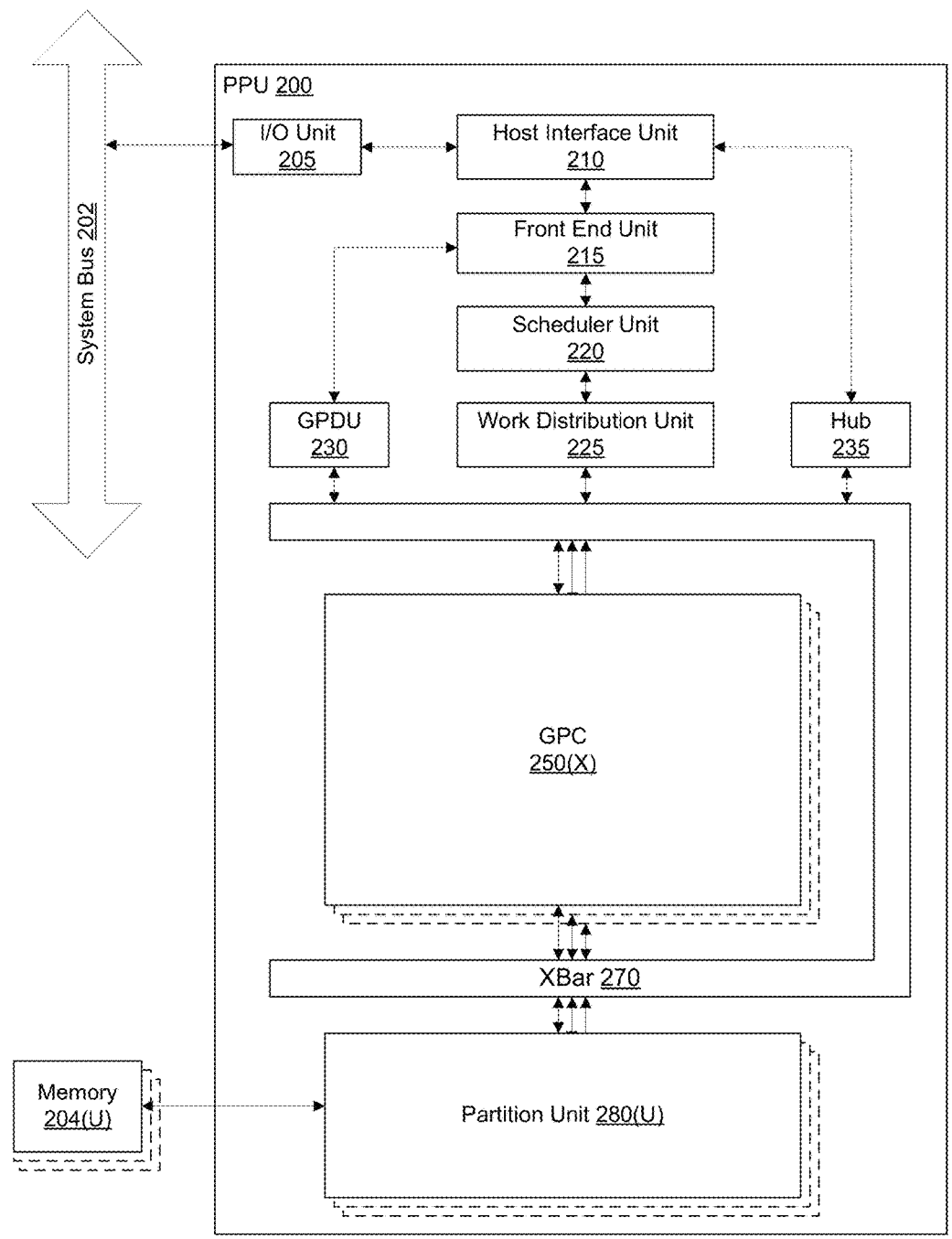
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
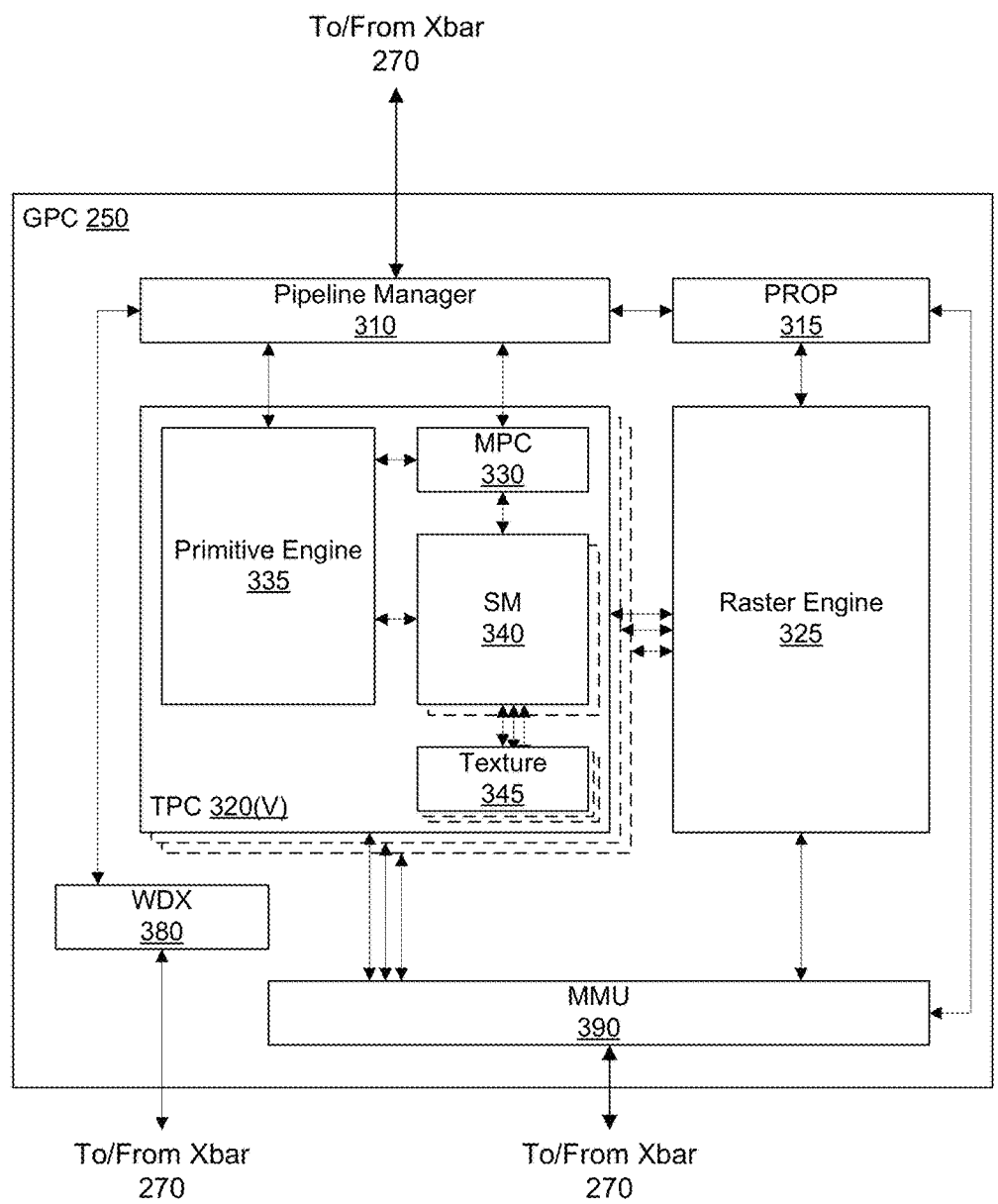
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
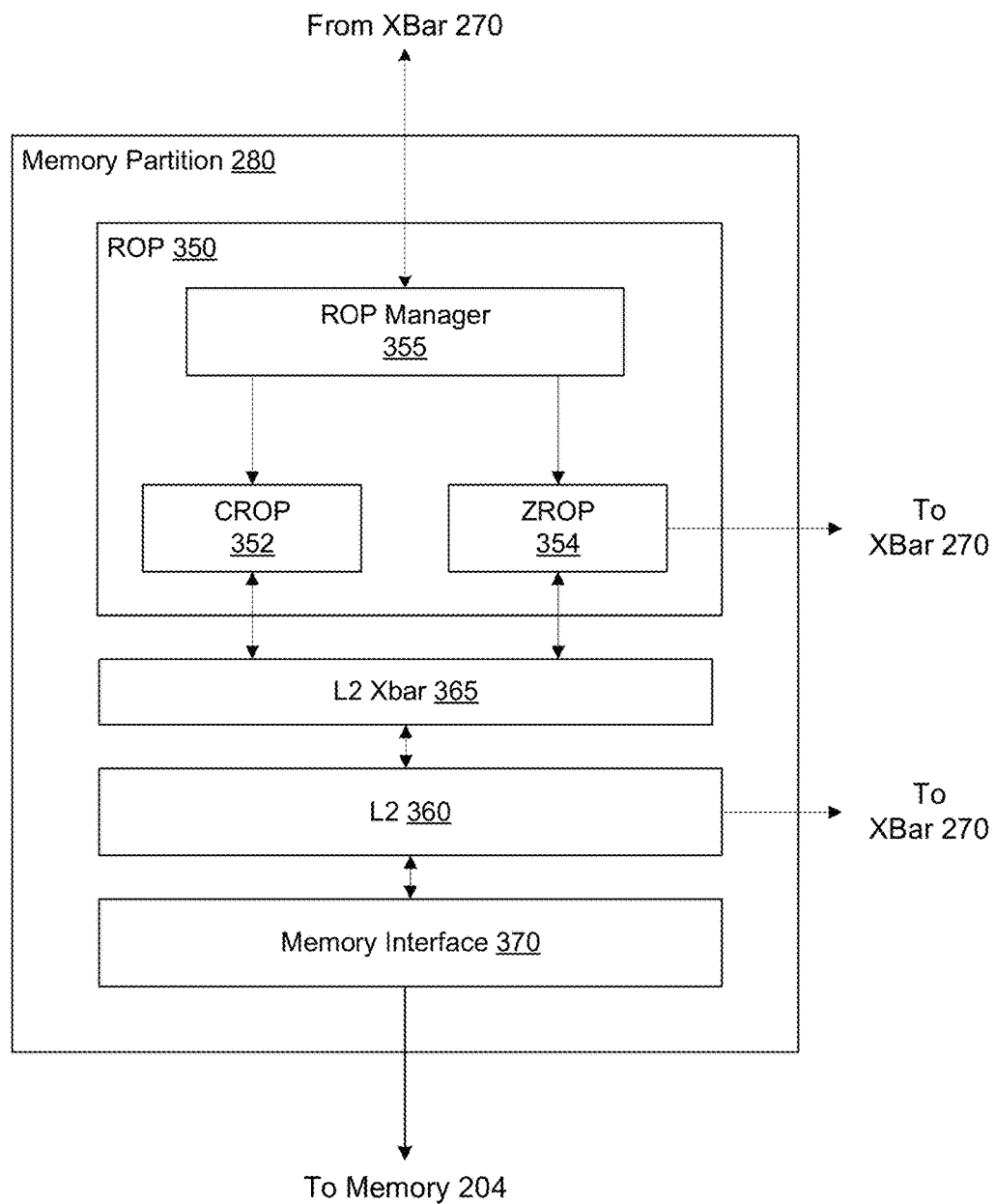
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
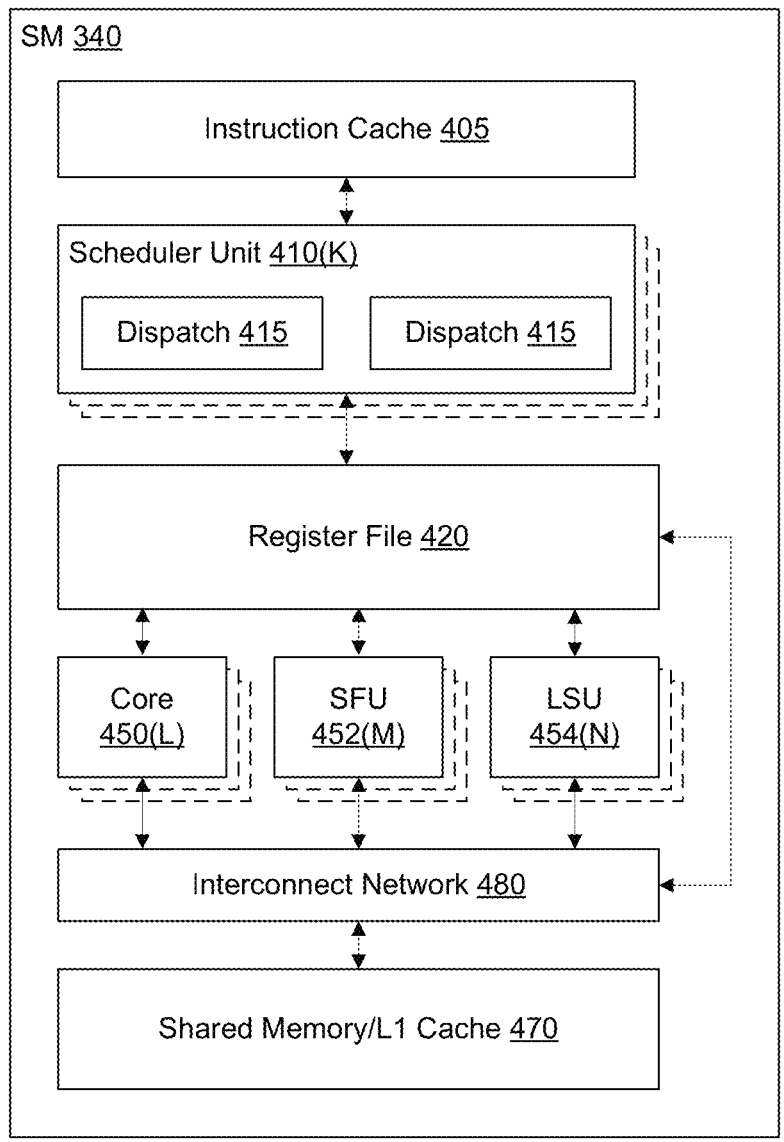
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., pixel blending operations, and the like), and N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
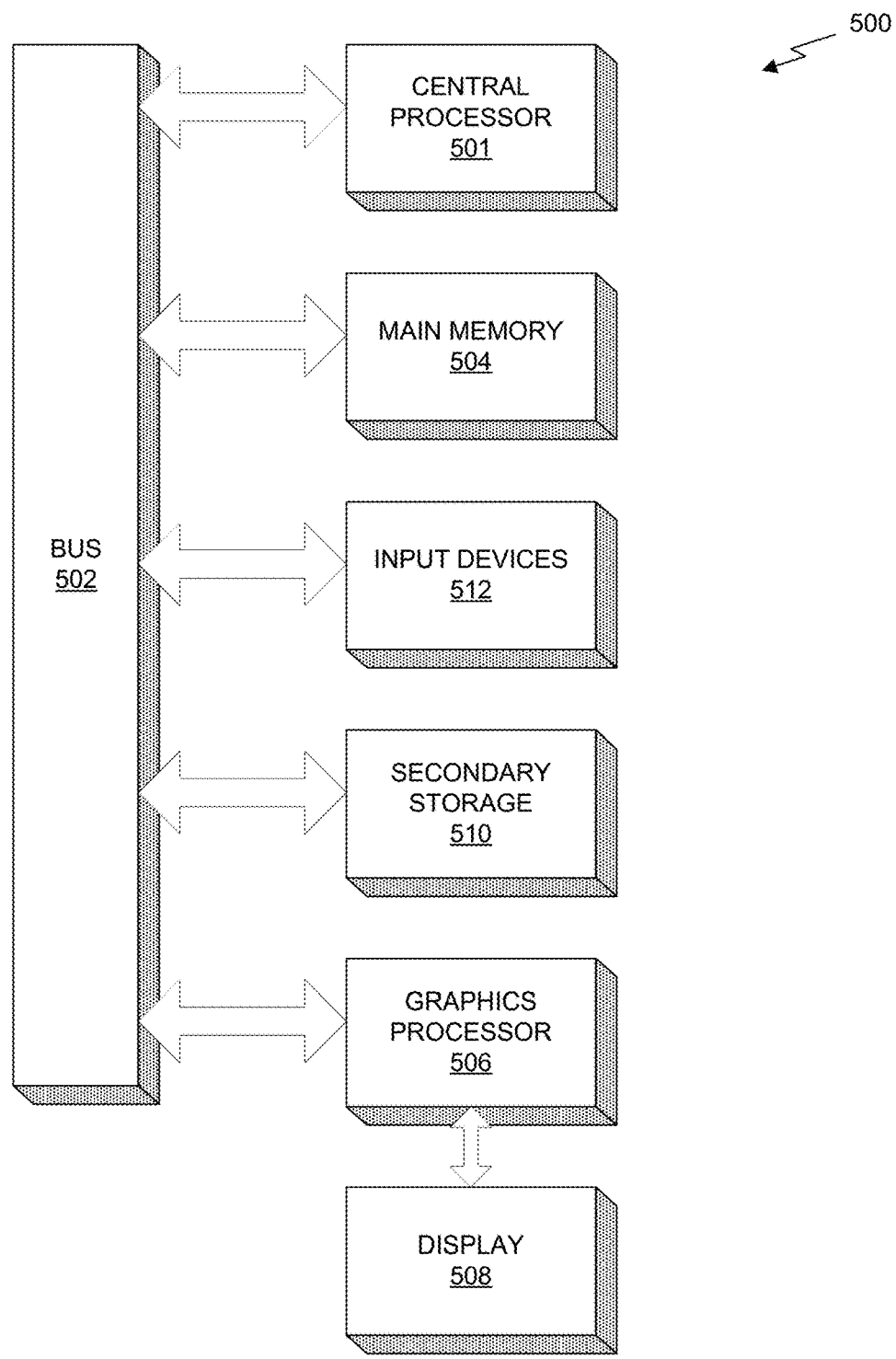
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 504 and/or the secondary storage 510. Such computer programs, when executed, enable the system 500 to perform various functions. The memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

Figure 6:
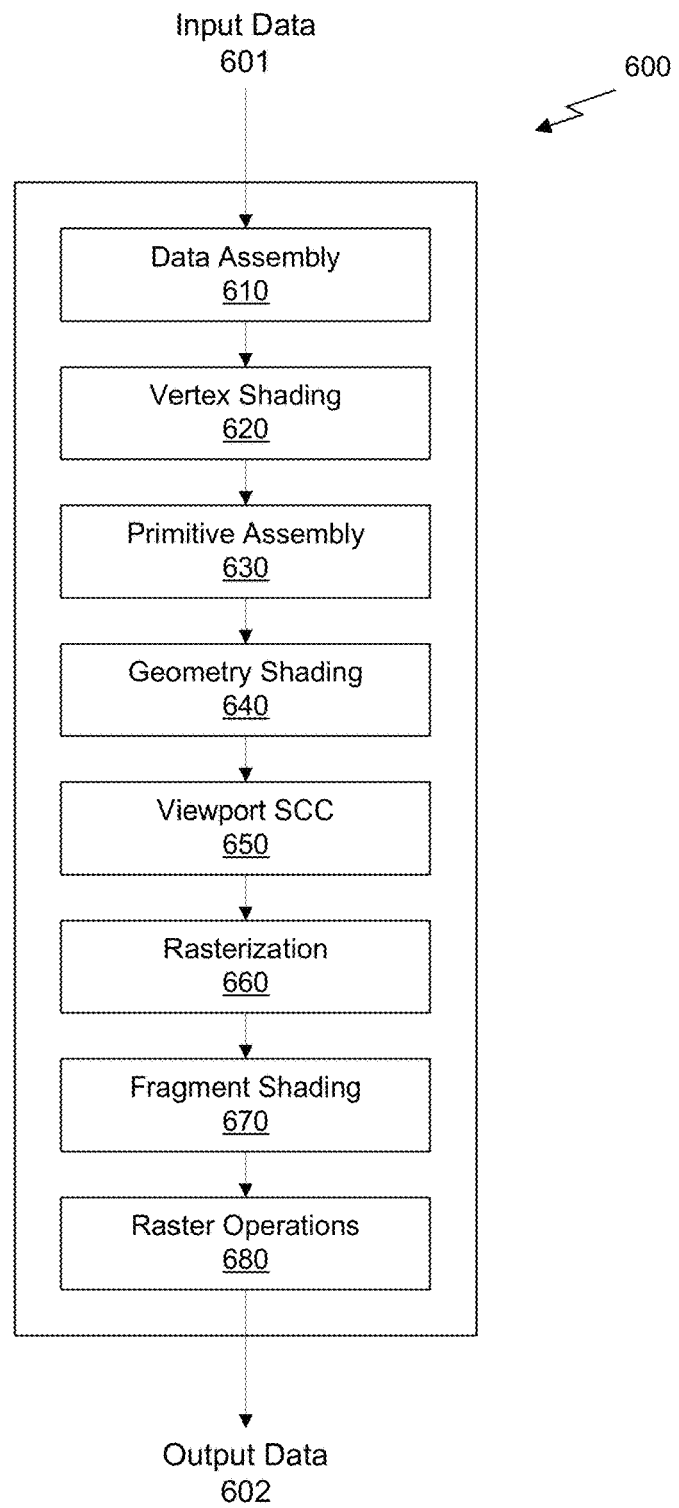
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 501. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 501. In other instances, the device driver may perform operations, at least in part, by launching operations on the PPU 200 utilizing an input/output interface between the CPU 501 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

While various embodiments have been described above, it should be understood that they have been presented by way of example only, and not limitation. Thus, the breadth and scope of the present application should not be limited by any of the above-described exemplary embodiments, but should be defined only in accordance with the following and later-submitted claims and their equivalents.

What is claimed is:

1. A method, comprising:
   identifying a three-dimensional (3D) position for a primitive fragment in a 3D coordinate space;
   calculating a localized scale for discretization of the 3D position based on gradients at the 3D position;
   calculating a discretized position based on the 3D position and the localized scale, wherein the discretized position is constant within a region of the 3D coordinate space proximate the 3D position, the region having a size in accordance with the localized scale;
   providing the discretized position as an input to a hash function to produce a hash value;
   sampling, by a graphics processing unit (GPU), an attribute associated with the primitive fragment to produce an alpha value; and
   generating, by the GPU, graphics data for a pixel associated with the primitive fragment based on an alpha test that compares the alpha value to the hash value as an alpha threshold.

2. The method of claim 1, wherein the 3D coordinate space is object space.

3. The method of claim 1, wherein the 3D coordinate space is world space.

4. The method of claim 1, wherein the 3D coordinate space is texture space.

5. The method of claim 1, wherein calculating the localized scale comprises:
   determining a maximum gradient scalar of the gradients at the 3D position; and
   calculating the localized scale based on the maximum gradient scalar and a hash scale value.

6. The method of claim 5, wherein calculating the discretized position comprises:
   multiplying component values of the 3D position by the localized scale.

7. The method of claim 1, wherein calculating the localized scale comprises:
   calculating a maximum gradient vector of the gradients at the 3D position; and
   calculating the localized scale based on the maximum gradient vector and a hash scale value.

8. The method of claim 7, wherein calculating the discretized position comprises:
   multiplying component values of the 3D position by corresponding components of the localized scale.

9. A system, comprising:
   a processor coupled to a memory, the processor configured to:
   identify a three-dimensional (3D) position for a primitive fragment in a 3D coordinate space;

calculate a localized scale for discretization of the 3D position based on gradients at the 3D position;

calculate a discretized position based on the 3D position and the localized scale, wherein the discretized position is constant within a region of the 3D coordinate space proximate the 3D position, the region having a size in accordance with the localized scale;

provide the discretized position as an input to a hash function to produce a hash value;

sample an attribute associated with the primitive fragment to produce an alpha value; and generate graphics data for a pixel associated with the primitive fragment based on an alpha test that compares the alpha value to the hash value as an alpha threshold.

10. The system of claim 9, wherein the 3D coordinate space is one of: an object space, a world space, a texture space.

11. The system of claim 9, wherein to calculate the localized scale, the processor is further configured to:

determine a maximum gradient scalar of the gradients at the 3D position; and calculate the localized scale based on the maximum gradient scalar and a hash scale value.

12. The system of claim 11, wherein to calculate the discretized position, the processor is further configured to:

multiply each component value of the 3D position by the localized scale.

13. A non-transitory, computer-readable storage medium storing instructions that, when executed by a processor, cause the processor to:

identify a three-dimensional (3D) position for a primitive fragment in a 3D coordinate space;

calculate a localized scale for discretization of the 3D position based on gradients at the 3D position;

calculate a discretized position based on the 3D position and the localized scale, wherein the discretized position is constant within a region of the 3D coordinate space proximate the 3D position, the region having a size in accordance with the localized scale;

provide the discretized position as an input to a hash function to produce a hash value;

sample an attribute associated with the primitive fragment to produce an alpha value; and generate graphics data for a pixel associated with the primitive fragment based on an alpha test that compares the alpha value to the hash value as an alpha threshold.

14. The non-transitory, computer-readable storage medium of claim 13, wherein to calculate the localized scale, the instructions cause the processor to:

determine a maximum gradient scalar of the gradients at the 3D position; and calculate the localized scale based on the maximum gradient scalar and a hash scale value.

15. The non-transitory, computer-readable storage medium of claim 14, wherein to calculate the discretized position, the instructions cause the processor to:

multiply each component value of the 3D position by the localized scale.

* * * * *